US012216009B2

United States Patent
Geyer (10) Patent No.: US 12,216,009 B2
(45) Date of Patent: Feb. 4, 2025

(54) ARRANGEMENT AND METHOD FOR DETERMINING TEMPERATURES OF ELECTRONIC COMPONENTS

(71) Applicant: Siemens Aktiengesellschaft, Munich (DE)

(72) Inventor: Horst Geyer, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 129 days.

(21) Appl. No.: 18/029,836

(22) PCT Filed: Sep. 17, 2021

(86) PCT No.: PCT/EP2021/075578
§ 371 (c)(1),
(2) Date: Mar. 31, 2023

(87) PCT Pub. No.: WO2022/069252
PCT Pub. Date: Apr. 7, 2022

(65) Prior Publication Data
US 2023/0299662 A1   Sep. 21, 2023

(30) Foreign Application Priority Data

Oct. 1, 2020   (EP) .................................... 20199593

(51) Int. Cl.
*G01K 7/42*   (2006.01)
*H02M 1/32*   (2007.01)

(52) U.S. Cl.
CPC .............. *G01K 7/42* (2013.01); *H02M 1/327* (2021.05); *G01K 7/427* (2013.01); *G01K 2217/00* (2013.01)

(58) Field of Classification Search
CPC ......... H02M 1/327; G01K 7/42; G01K 7/427; G01K 2217/00
See application file for complete search history.

(56) References Cited

U.S. PATENT DOCUMENTS

2009/0228726 A1 * 9/2009 Malik ................... G06F 1/3203
                                                  703/2
2011/0157944 A1 * 6/2011 Jiang .................. G05D 23/1935
                                                  327/427
(Continued)

FOREIGN PATENT DOCUMENTS

DE   102 03 577 A1   8/2003
DE   102011087764 A1 *   6/2013   ......... G01R 31/2642
JP   2007028741 A   2/2007

OTHER PUBLICATIONS

PCT International Search Report and Written Opinion of International Searching Authority mailed Nov. 24, 2021 corresponding to PCT International Application No. PCT/EP2021/075578 filed Sep. 17, 2021.

*Primary Examiner* — John C Kuan
(74) *Attorney, Agent, or Firm* — Henry M. Felerelsen LLC (57) ABSTRACT

An arrangement includes a supply unit of an industrial control system and a superordinate computing unit assigned to the supply unit. The supply unit includes an electronic assembly which includes an electronic component. The supply unit is configured to calculate a first temperature of the electronic component using a first thermal model. The superordinate computing unit is configured to calculate a second temperature of the electronic component using a second thermal model when the supply unit is without current, with the supply unit providing the superordinate computing unit with relevant data for a calculation of the second thermal model. The supply unit and the superordinate computing unit interact in such a way that at least one of the first temperature and the second temperature of the electronic component is calculated.

21 Claims, 4 Drawing Sheets

(56) References Cited

U.S. PATENT DOCUMENTS

2012/0217795 A1* 8/2012 Hasegawa ............... H02M 7/48
307/9.1
2018/0017613 A1* 1/2018 Qiao ................... G01R 31/2619
2018/0145624 A1* 5/2018 Kim ..................... H02P 25/024

* cited by examiner

ARRANGEMENT AND METHOD FOR DETERMINING TEMPERATURES OF ELECTRONIC COMPONENTS

CROSS-REFERENCES TO RELATED APPLICATIONS

This application is the U.S. National Stage of International Application No. PCT/EP2021/075578, filed Sep. 17, 2021 which designated the United States and has been published as International Publication No. WO 2022/069252 A1 and which claims the priority of European Patent Application, Ser. No. 20/199,593.3, filed Oct. 1, 2020, pursuant to 35 U.S.C. 119 (a)-(d).

BACKGROUND OF THE INVENTION

The invention relates to an arrangement comprising a supply unit of an industrial control system and a superordinate computing unit which is assigned to the supply unit. The supply unit has at least one electronic assembly which comprises at least one electronic component. The supply unit is designed and/or configured to calculate a first temperature of the at least one electronic component by means of a first thermal model.

The invention also relates to a method for determining at least one temperature of at least one electronic component of at least one electronic assembly of a supply unit of an industrial control system, said supply unit being provided with a superordinate computing unit. In this case, a first temperature of the at least one electronic component can be calculated by the supply unit with the aid of a first thermal model.

The invention further relates to a computer program, in particular a cloud app, comprising instructions which, when said program is executed by the aforementioned arrangement, cause the arrangement to execute the aforementioned method.

The invention additionally relates to a data carrier signal which is transferred by the aforementioned computer program, and to a machine-readable storage medium comprising the aforementioned computer program, said storage medium being e.g. volatile or non-volatile.

Arrangements and methods of the type cited above are known from the prior art. The calculation of the temperature of the electronic assembly, e.g. an IGBT (Insulated-Gate Bipolar Transistor), is usually performed by means of software that can be executed on the supply unit, in particular on the converter, and is usually based on a sensor temperature which measures the temperature of the cooling plate on which the IGBT module is mounted. Devices such as supply units can have different numbers of temperature sensors in this context. These sensors are then assigned to the appropriate chip. In the case of converters which are designed as combination of control unit and power section, a temperature is currently only calculated on the power section, which then provides the temperature to the control unit so that the control unit can display this temperature externally, e.g. via an *IBIS* tool.

Determining the temperature of electronic components such as e.g. IGBTs can help to protect them from overheating, for example. If the calculated value of the temperature exceeds a specified value in this case, the temperature of the corresponding electronic component can be reduced by e.g. disconnecting the supply unit, e.g. a converter, or by reactions such as e.g. reducing the current and/or reducing the pulse frequency in the supply unit.

It is also possible using the temperature values of the electronic components and the powercycling curves provided by the manufacturer to perform a wear calculation for each component, e.g. for each IGBT chip. It applies in this case that the more accurately the chip temperatures are determined, the more accurately such wear calculations can be performed.

Moreover, a device/supply unit on which it is possible to ascertain the chip temperature very accurately can be better utilized since a smaller safety factor needs to be taken into account when designing the devices/supply units.

A further problem occurs in that the temperature calculation cannot take place if the supply unit is without current. When the supply unit is restarted, there is no information about the temperature of the electronic components in the supply unit before the supply unit was disconnected. It may therefore be necessary initially to estimate the temperature of its electronic components when the supply unit is restarted. Such an estimate is not reliable and does not lead to optimal results.

On the basis of the foregoing, the object of the present invention can be considered to be that of further developing the arrangements and methods cited in the introduction, and thereby allowing a reliable and preferably more accurate determination of the temperature of the electronic components in the supply units, in particular in the converters.

SUMMARY OF THE INVENTION

The above cited object is inventively achieved by an arrangement as cited in the introduction in that the superordinate computing unit is configured to calculate a second temperature of the at least one electronic component by means of a second thermal model, the supply unit and the superordinate computing unit interacting (during operation) in such a way that at least the first temperature or the second temperature of the at least one electronic component is calculated.

The superordinate computing unit can e.g. take responsibility for the temperature calculation, such that only the second temperature is calculated if the supply unit is switched off. This applies if a supply voltage is no longer present at the converter, for example, From this moment, the information about the temperature of the thermal section is lost. The superordinate computing unit, e.g. a superordinate controller, an Edge device or a cloud server can take responsibility for the calculation of the temperature and give this information to the converter when it is switched on again. It is thereby ensured that a calculated temperature, not an estimated or presumed temperature, of the at least one electronic component is available at all times when the industrial control system is operating. Reliable determination of the temperature of the at least one electronic component is thereby possible.

For example, as long as a data connection exists between the supply unit and the superordinate computing unit, it is conceivable for the supply unit to receive all the data (e.g. temperatures and preferably wear values) that is relevant (for operation of the supply unit) from the superordinate computing unit, said data being used to calculate the second temperature and preferably also wear values based on the second temperature. If the data connection fails, the supply unit can take responsibility for the calculation again.

In an embodiment variant, provision can therefore advantageously be made for the supply unit to be designed as a converter of e.g. an industrial control system for operating an automation facility.

Furthermore, in an embodiment variant, provision can advantageously be made for the computing unit to be designed as a superordinate controller, as an Edge device or as a cloud server.

In an embodiment variant, provision can advantageously be made for the respective thermal model to be stored on the supply unit and on the superordinate computing unit.

In an embodiment variant, it can be advantageous for the second thermal model to be more detailed than the first thermal model such that the second temperature, calculated by means of the second thermal model, is more accurate than the first temperature, calculated by means of the first thermal model. Given an improved calculation of the temperature of the at least one electronic component, it is also possible more effectively to perform the wear calculations for this at least one electronic component. Greater accuracy can be obtained thereby.

In an embodiment variant, provision can advantageously be made for taking a current temperature of the at least one electronic component into account when calculating the power loss by means of the second thermal model. This can be effected e.g. in that the forward characteristic for the power loss calculation is obtained with reference to the temperature that is currently calculated (on the superordinate computing unit or in the supply unit).

The second thermal model can therefore be calculated iteratively, wherein better results can be achieved with each iteration when ascertaining the temperature of the at least one electronic component. When performing the power loss calculation in the context of the first thermal model, a forward characteristic corresponding to the highest temperature of the at least one electronic component is always taken as a starting point.

This allows the power loss to be calculated more accurately. Excessive variations between the power losses calculated by means of the first thermal model and by means of the second thermal model can indicate a defective design of the first thermal model, thereby allowing improvements to be derived for the simplified first thermal model.

In an embodiment variant, provision can advantageously be made for taking non-linear representations of the forward characteristics, e.g, via lookup tables, and switching energy losses into account during the calculation of the second thermal model.

In an embodiment variant, provision can advantageously be made for the at least one electronic assembly to have two or more electronic components, preferably two or more IGBT chips, the individual electronic components, preferably the individual IGBTs, being considered individually during the calculation of the second thermal model, such that the second temperature is calculated for each individual electronic component, preferably for each individual IGBT chip.

In an embodiment variant, provision can advantageously be made for the at least one electronic assembly to have two or more electronic components, preferably two or more IGBT chips, thermal couplings between the individual electronic components, preferably between the individual IGBTs or between the IGBTs and diodes etc., being taken into account during the calculation of the second thermal model.

In an embodiment variant, provision can advantageously be made for the at least one electronic assembly to have two or more electronic components, preferably two or more IGBT chips, different thermal sections being taken into consideration when ascertaining the second temperature for different electronic components.

In an embodiment variant, provision can advantageously be made for the supply unit to comprise two or more electronic assemblies, preferably two or more IGBT modules, thermal couplings between the individual electronic assemblies, preferably between the individual IGBT modules, being taken into account when calculating the second temperature.

As a result of more effectively ascertaining the temperature of each individual electronic component, preferably each individual IGBT chip, it is possible to calculate wear of the IGBT module more accurately, thereby allowing the current state of the IGBT to be indicated more accurately.

In the embodiment, it can be appropriate for the electronic assembly to comprise at least one temperature sensor and for the second thermal model to have an option to determine a temperature of the temperature sensor—a so-called virtual sensor temperature.

These calculated virtual sensor temperatures can be compared with the sensor temperatures that are actually measured by the temperature sensors. Excessive variations between the values can indicate a defect of the temperature sensors. This can trigger e.g. an alarm to the effect that a temperature sensor is defective. In this case, the calculation of the (first and/or second) temperature can be continued using the virtual sensor temperature.

The second thermal model can therefore have an option whereby one (or more) virtual sensor temperature(s) are calculated, it being possible using the calculated virtual sensor temperature(s) to validate the temperature(s) that are measured by the temperature sensor(s).

As mentioned above, in an embodiment variant, provision can be made for the supply unit to comprise a plurality (two, three, four, five or six) of electronic assemblies, it being possible for each electronic assembly in turn to have two or more electronic components. In this case, the second thermal model can have an option to take thermal couplings between the individual electronic assemblies and/or between the individual electronic components of the respective electronic assemblies into account.

Furthermore, the above cited object of the invention is inventively achieved by a method as cited in the introduction in that the superordinate computing unit is able to calculate a second temperature of the at least one electronic component by means of a second thermal model, the supply unit and the superordinate computing unit interacting (when the industrial control system is operating) in such a way that at least one of the temperatures of the at least one electronic component is calculated.

In an embodiment variant, it can be appropriate to calculate the first temperature and the second temperature simultaneously.

The chip temperature (the first temperature) as determined in the supply unit, e.g. in the converter, can be compared with the temperature (second temperature) as determined in the superordinate computing unit, e.g. on a cloud server. If the variations are excessive, this can indicate a defective design of the (simplified) thermal model in the converter (the first thermal model), whereupon improvements can be derived for the first thermal model.

In an embodiment variant, further advantages can be obtained by determining a (second) wear value of the at least one electronic component on the basis of the second temperature. It is likewise possible to calculate a (first) wear value on the basis of the first temperature. If the determined values of the two wear values differ significantly from each other, this can likewise indicate a defective design of the first thermal model. Improvements for the first thermal model can be derived therefrom.

In an embodiment variant, it can be appropriate to adapt a maintenance plan for the supply unit on the basis of the wear value that is determined using the second temperature.

In an embodiment variant, provision can be made for the calculation of the first temperature or the second temperature to comprise at least one of the following substeps:
calculating a power loss,
calculating a thermal section.

For example, it is conceivable for the power loss calculation to be performed only on the converter (in the context of the first thermal model) and for the resulting values to be transferred to the superordinate computing unit, e.g. a superordinate controller. This means that in an embodiment variant, provision can be made for only a more complex calculation of the thermal section to take place (by means of the second thermal model) in the superordinate computing unit, e.g. in the superordinate controller.

Losses of the electronic components, e.g. IGBTs and diodes, are calculated in the context of the first thermal model with reference to the current operating point and to the data that is stored in the supply unit (Vcesat, switching loss characteristics, etc.).

First temperatures (gap temperatures between the respective chip and its sensor) are calculated in the context of the first thermal model with reference to the losses that were determined in the power loss calculation, using the data stored in the supply unit (thermal resistances and thermal time constants). In the context of the present disclosure, the term gap temperature is understood to be a temperature difference which is calculated over the thermal sections between a temperature at the chip (IGBT, diode, etc.) and a temperature at a reference point, e.g. a temperature sensor. Addition of the respective gap temperatures to the appropriate sensor temperatures results in the chip temperatures, since the aforementioned differences are added to the corresponding sensor temperatures in this way.

In an embodiment variant, provision can advantageously be made for the calculation of the second (but not the first) temperature to comprise one or more of the following substeps (which cannot be executed when calculating the first temperature):
taking a current temperature into account as part of a power loss calculation,
taking non-linear representations of the forward characteristics and switching energy losses into account,
if the at least one electronic assembly has two or more electronic components, considering individual electronic components of the at least one electronic assembly individually, such that the second temperature is calculated for each individual electronic component, and/or taking thermal couplings between the individual electronic components into account
and/or taking different thermal sections into consideration in the case of different electronic components,
if the supply unit comprises two or more electronic assemblies, taking thermal couplings between the individual electronic assemblies into account.

In an embodiment variant, it can be appropriate for the electronic assembly to comprise at least one temperature sensor and for a temperature of the temperature sensor to be determined during the calculation of the second thermal model.

In an embodiment variant without the temperature sensor, provision can be made for specifying a (fixed or constant) reference temperature for the (first and/or second) thermal model (e.g. always 25° C.).

BRIEF DESCRIPTION OF THE DRAWING

The invention is described and explained in greater detail below with reference to the exemplary embodiments illustrated in the figures, in which.

DETAILED DESCRIPTION OF PREFERRED EMBODIMENTS

Figure 1:
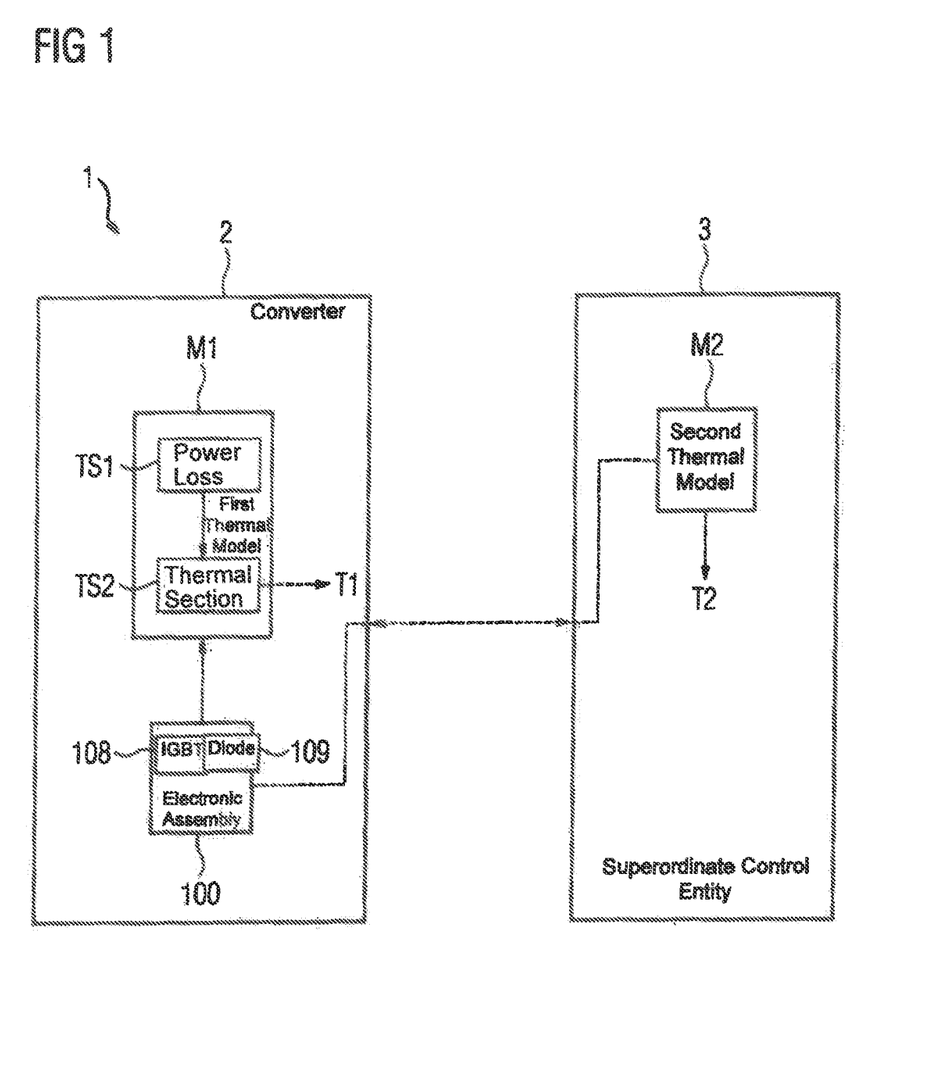
FIG. 1 shows part of an industrial control system comprising a converter with a superordinate control entity.

In the exemplary embodiments and figures, identical elements or elements which act in an identical manner may be denoted by the same reference signs in each case. Furthermore, the reference signs in the claims and in the description merely serve to allow better understanding of the present application and should not in any case be considered as a limitation of the subject matter of the present invention, FIG. 1 shows an arrangement 1 which corresponds to the inventive arrangement. The arrangement 1 comprises a converter 2 with a superordinate control entity 3. The converter 2 comprises an IGBT module 100 which has e.g. an IGBT (bipolar transistor with insulated gate electrode) 108 and a diode 109.

The arrangement 1 can be designed as, for example, part of an industrial control system (not shown here) for process control in an automation facility. In this case, the converter 2 can be provided for the purpose of supplying current/voltage to an electric e.g. rotary machine (not shown here), in particular an asynchronous motor.

Figure 2:
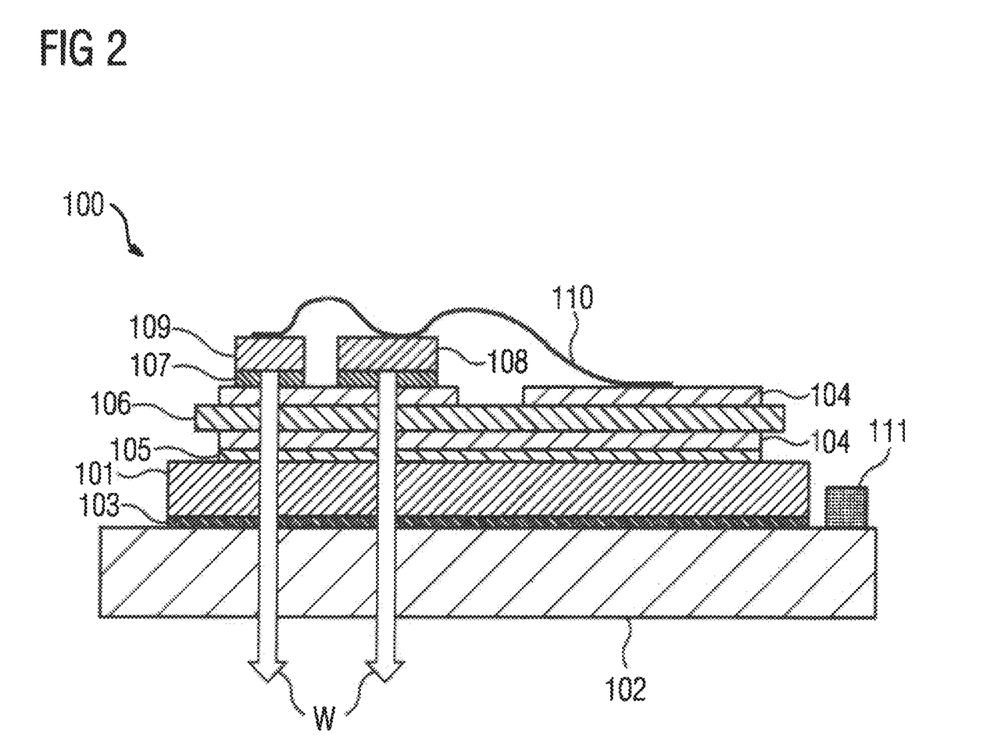
FIG. 2 shows a cross section of an IGBT module.

FIG. 2 shows a cross section through the IGBT module 100, FIG. 2 also shows that the IGBT module 100 comprises a baseplate 101. A layer of heat transfer compound 103 is applied to one side of the baseplate 101. A layer of tin solder 105 is applied to another side, opposite to the side of the baseplate 101 with the heat transfer compound 103. The layer of the heat transfer compound 103 is designed as an intermediate layer between the baseplate 101 and a heat sink 102. The tin solder layer 105 is designed as an intermediate layer between the baseplate 101 and a copper layer 104, said copper layer 104 supporting a ceramic lamina 106. The ceramic lamina 106 has copper layers 104, 104' on both sides. The IGBT 108 and the diode 109 are attached to part of a further copper layer 104', this facing away from the tin solder layer 105, and are secured to the further copper layer 104' by means of further tin solder layers 107. The IGBT 108, the diode 109 and a further part of the further copper layer 104', this facing away from the tin solder layer 105, are connected by means of a bond wire 110. In addition to this, the IGBT module 100 has a temperature sensor 111. The heat flow through the IGBT module 100 (from the diode 109 and from the bipolar transistor 108 towards the heat sink 102) is shown by arrows W.

The converter 2 can have software or a computer program and means for executing the software or the computer program, the software or the program being able to calculate a first temperature T1 of the IGBT 108 by means of a first thermal model M1, this being stored e.g. in the converter 2.

The calculation by means of the first thermal model M1 can comprise e.g. two substeps TS1, TS2 and preferably consist of these two substeps TS1, TS2.

In the first substep TS1, a power loss can be calculated. In this case, losses of the IGBT 109 (or of all bipolar transistors if more than one) and of the diode 108 (or of all diodes if more than one) can be calculated with reference to the current operating point of the converter 2 and to the data that is stored in the converter 2 (Vcesat, switching loss characteristics, etc.).

The calculation of the power loss can be done with the aid of e.g. the characteristics. In this case, a characteristic at which the losses are greatest is often used as a basis. The characteristic can be selected or ascertained with reference to the calculated first or second temperature. This means that the power loss calculation can take place using the calculated chip temperature.

The calculation of the first and/or second temperature T1 and/or T2 can (if the temperature sensor 111 is present) be effected with the aid of a sensor temperature that has been measured by means of the sensor 111. In this case, the temperature sensor 111 measures the temperature of the cooling plate 102. The IGBT module 100 can conceivably have a plurality of sensors 111—if there is a plurality of IGBT modules, different IGBT modules can have different numbers of temperature sensors. Each sensor is preferably assigned to one or more chips, e.g. the IGBT 108 or the diode 109 (FIG. 2).

In the second substep TS2, a thermal section can be calculated. On the basis of the losses determined in the power loss calculation (substep TS1), it is possible with reference to the data that is stored in the converter 2 (e.g. thermal resistances and thermal time constants) to calculate a temperature between the chip, e.g. the IGBT 108 or the diode 109, and its sensor 111 (also referred to as a gap temperature). In the case of a single chip, e.g. an IGBT 108, this is the first temperature T1. In the case of a plurality of chips (IGBT 108, diode 109 etc.), the gap temperatures between the respective chip and its sensor can be calculated for every chip-sensor pair. As mentioned above, the chip temperatures can be obtained by adding the respective gap temperatures to the appropriate sensor temperatures.

For example, the thermal section between the IGBT chip 108 and the sensor 111 can be represented by three thermal resistances with three thermal time constants. This means that with reference to the current operating point of the converter 2 (current, voltage, frequency, drive level) it is possible to calculate the current first temperature T1 of the IGBT 108.

The superordinate control entity 3 is configured to calculate a second temperature T2 of the IGBT 108 by means of a second thermal model M2. For this purpose, the superordinate control entity 3 can likewise comprise software or a computer program and means for executing the software or the computer program.

It is understood that a converter can comprise a plurality of IGBT modules. In this case, the temperatures T1, T2 of the respective electronic components (IGBTs and/or diodes, etc.) in each individual IGBT module can be calculated by means of the aforementioned software programs, for example.

The converter 2 and the superordinate control entity 3 interact in such a way that when the automation facility and consequently the industrial control system are operating, at least one of the temperatures T1, T2 is always calculated, i.e. at every instant. For example, when the converter 2 is operating, both the first temperature T1 and the second temperature T2 can be calculated, preferably simultaneously, and e.g. compared with each other.

It is moreover conceivable to calculate only the first or only the second temperature, in order to economize the available computing resources.

It can also be appropriate to continue calculating the second temperature T2 when the converter 2 is no longer receiving a current. In this case, the calculated value of the second temperature T2 can be used as an initial value when the converter 2 is restarted.

The first thermal model M1 can be embodied in a simplified manner in order to economize the computing resources of the converter 2, for example. This means that the second thermal model M2 can be more detailed than the first thermal model M1.

For example, the first thermal model M1 can comprise one or more of the following simplifications in comparison with the second thermal model M2:
  not taking the current temperature T2 into account in the power loss calculation,
  simplified e.g. only linear representations of the forward characteristics and switching energy losses,
  not considering the IGBT and diode temperature separately (only IGBT temperatures are calculated in the first thermal model M1),
  simplified representation of the thermal couplings between the elements, such that e.g. thermal couplings between the electronic components are not taken into account (e.g. thermal coupling between IGBT 108 and diode 109 or between individual electronic assemblies, e.g. IGBT modules 100),
  simplified representation of the thermal sections of the components, such that e.g. the same thermal section is assumed for all IGBT chips 108.

Conversely, this means that in comparison with the first thermal model M1, the second thermal model M2 has one or more of the additional options listed above.

As a result of taking the current temperature into account, the temperature dependency of the forward characteristics can be taken into account. The temperature dependency of the forward characteristics can be realized in the form of a feedback path, for example, wherein the second thermal model M2 is applied iteratively and a value of the second temperature T2 that is calculated in one iteration is used as an input value in the next iteration. For example, in a first iteration (e.g. as part of a power loss calculation), the second thermal model M2 can be applied on the basis of a characteristic which corresponds to the highest temperature of the IGBT 108. The current temperature value of the IGBT 108 thus determined can subsequently be used in a second iteration in order to perform the power loss calculation using a further characteristic, said further characteristic being selected on the basis of the current temperature value of the IGBT 108. The second thermal model M2 can therefore allow the temperature dependency of the forward characteristics to be taken into account.

In the first thermal model M1, the same thermal section between the chip 108, 109 and the temperature sensor 111 is assumed for each chip (IGBT chip 108) or diode 109. During the thermal measurements of the converter, all sections between the respective chip (IGBT, diode) 108, 109 and corresponding temperature sensor 111 can be measured and stored in the converter, measurement and storage of a single "worst-case" section also being conceivable, for example.

The second thermal model M2 can be applied without this assumption and the calculation of the second temperature T2 can be based on different thermal sections for different chip-sensor pairs.

The first thermal model M1 within the converter software is therefore designed merely to protect the IGBT chips 108 from overheating.

Using the second thermal model M2, it is also possible to take thermal couplings between individual IGBT modules 100 into account if the converter 2 comprises a plurality of IGBT modules 100. It is thereby possible to achieve reliable protection of the converter while maintaining at least consistent converter performance. It is thereby possible in particular to avoid rapid derating of the converter.

If the second thermal model M2 also takes into account that each chip (e.g. IGBT chip 108 or diode 109) has its own thermal section and that the individual electronic components 108, 109 are thermally coupled together, it is further possible to calculate the wear of the individual chips 108, 109 and to reduce inaccuracies when calculating the wear of the individual chips 108, 109.

The calculation of the first temperature T1 in the software of the converter 2 can take place in parallel with the calculation of the second temperature T2 in the superordinate control entity 3.

The superordinate control entity 3 can be designed as an Edge device or as a cloud server. In this type of configuration, the superordinate control entity 3, e.g. the Edge device, can make use of the previously described considerably more complex second model M2 for the calculation of the power losses and of the thermal sections, and can also calculate this second model M2 efficiently (in terms of time and/or resources).

Non-linear representations of the forward characteristics and switching energy losses can be taken into account in the second thermal model M2 (e.g. via lookup tables). This makes it possible to achieve a more precise representation of the forward characteristics, for example. The forward loss characteristics have approximately the shape of an e-function (exponential function). In the first thermal model M1, this e-function is represented by means of a simple straight-line equation for the sake of simplicity, thereby inevitably producing errors in the calculation. In the second thermal model M2, this characteristic can be represented precisely (e.g. as a lookup table), thereby allowing the errors in the calculation of the losses to be reduced.

In the case of the second thermal model M2, it is possible e.g. to store a separate thermal section for each IGBT chip 108.

Furthermore, it is also possible to calculate the diode temperatures separately in the second thermal model M2, i.e. independently of the calculation of the IGBT temperatures.

Furthermore, by virtue of the significant computing power and almost unlimited storage capacity of the Edge, it is also possible to represent very complex thermal couplings between individual components.

Figure 3:
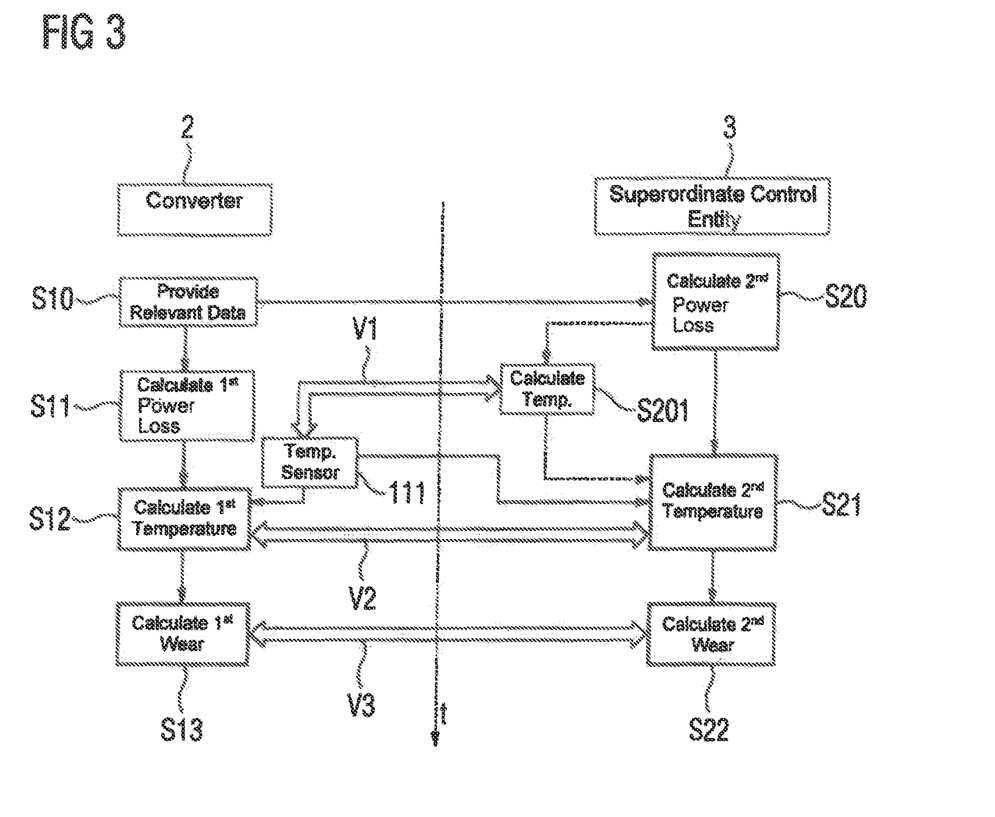
FIG. 3 shows a flow diagram of a method for parallel calculation of the IGBT temperatures.

FIG. 3 shows an example of the manner in which the converter 2 and the superordinate control entity 3 can interact. An arrow marked "t" indicates the temporal sequence.

In a step S10, the converter 2 provides the superordinate control entity 3 with relevant data for the calculation of the second thermal model M2. This relevant data for the calculation of the second thermal model M2 may be e.g. current, voltages, drive levels, pulse frequencies, etc.

The relevant data can vary between that which is stored in the converter and that which is required for the calculation in the superordinate control entity. For this reason, the calculation by means of the first thermal model M1 and by means of the second thermal model M2 can take place differently. For example, drive levels may be taken into consideration in the context of the first thermal model M1, while modulation indices may be taken into consideration in the context of the second thermal model M2. For this reason, different data can be transferred.

In a step S11, a first power loss can be calculated by means of the converter 2, i.e. by means of the first thermal model M1. Preferably in parallel therewith, a second (more complex) power loss can be calculated in a step S20 by means of the superordinate control entity 3, i.e. by means of the second thermal model M2. When calculating the second power loss in the context of the second thermal model M2, one or more of the aforementioned additional options may be selected. For example, the current second temperature T2 and/or non-linear representations of the forward characteristics and/or switching energy losses can be taken into account in this way.

In the case of the second thermal model M2, provision can also be made for additionally calculating the temperature of the temperature sensor 111—or the temperature of each temperature sensor if there is a plurality of temperature sensors—step S201. The calculated temperature of the temperature sensor is also called the "virtual sensor temperature". These calculated virtual sensor temperatures can in turn be compared with the actually measured temperatures of the temperature sensors 111—step V1 Excessive variations between the values can indicate a defect of the temperature sensors. This could trigger an alarm to the effect that the temperature sensor 111 is defective. As a further consequence, the calculation by means of the first thermal model M1 in the converter 2 (and also by means of the second thermal model M2 in the superordinate control entity 3) can be continued using the virtual sensor temperature.

In a step S12, the first temperature T1 of the IGBT chip 108 can be calculated in the converter 2. As described above, the actually measured temperature of the temperature sensor 111 or the virtual sensor temperature can be used for this purpose.

Preferably in parallel with step S12, the second temperature T2 of the IGBT chip 108 can be calculated in the superordinate control entity 3 at step S21. When calculating the second temperature T2 using the second thermal model M2, one or more of the aforementioned additional options can be selected. For example, thermal couplings between different IGBT chips and/or between the IGBT chips and diodes (and/or other electronic components possibly included in the IGBT module 100 but not shown here) can be taken into account and/or different thermal sections for different IGBTs and/or diodes (and/or other electronic components possibly included in the IGBT module 100 but not shown here) can be used.

In a step V2, the first temperature T1 of the IGBT 108 can be compared with the second temperature T2.

In a step S13, a first wear of the IGBT 108 can be calculated in the converter 2 with reference to the calculated first temperature T1. Preferably in parallel therewith, a second wear of the IGBT 108 can be calculated in a step S22 on the superordinate control entity 3 on the basis of the calculated second temperature T2.

In a step V3, the first wear can be compared with the second wear.

By virtue of the foregoing, it is possible to increase the accuracy with which the wear of the IGBT 108 is determined because the wear is calculated on the basis of the second temperature T2, this being determined with the aid of the second thermal model M2. It is consequently possible to assess more accurately the state of the IGBT module 100, whereby a better maintenance service can be offered to customers. It is moreover possible to achieve a greater degree of resilience for the customer.

It is also conceivable during operation for the converter 2 to receive all data that is relevant to the operation of the converter 2 (temperatures and wear values) from the superordinate control entity 3, which may be situated e.g. in a cloud, provided a data connection exists between the converter 2 and the superordinate control entity 3. In this case, the first thermal model M1 need not be applied at all. The resources of the converter 2 can be economized thereby.

In the event that the data connection fails, the converter 2 can assume responsibility for the calculation of the first temperature T1 again using its own values.

It is further conceivable for the superordinate controller 3, e.g. the Edge device, to assume responsibility for the calculation of the second temperature 12 while the converter 2 is switched off. This means that a temperature can still be ascertained if the converter 2 does not have a power supply and is consequently unable to ascertain the first temperature T1. This is advantageous because if the converter 2 is disconnected, the information about the temperature of the IGBT 108 and in particular the information about the thermal section is lost. The aforementioned information would no longer be available at ail for the purpose of calculating the temperature of the IGBT 108 when the converter 2 was switched on again if the calculation of the temperature by means of the second thermal model M2 on the superordinate control entity 3 did not take place while the converter 2 was switched off. This means that when the converter 2 is switched off (has no supply voltage), the superordinate control entity 3 can continue to calculate the temperatures and communicate these temperatures to the converter 2 when it is switched on again.

If significant differences are identified when comparing the values in one or more of the aforementioned steps V1, V2, V3, this can indicate a defective design of the first thermal model M1. Improvements for developing the first thermal model M1 on the converter 2 can be derived therefrom. This means that the first thermal model M1 can be further developed in a continuous manner. It is also possible thereby to support the further development of runtime software on the converters.

Figure 4:
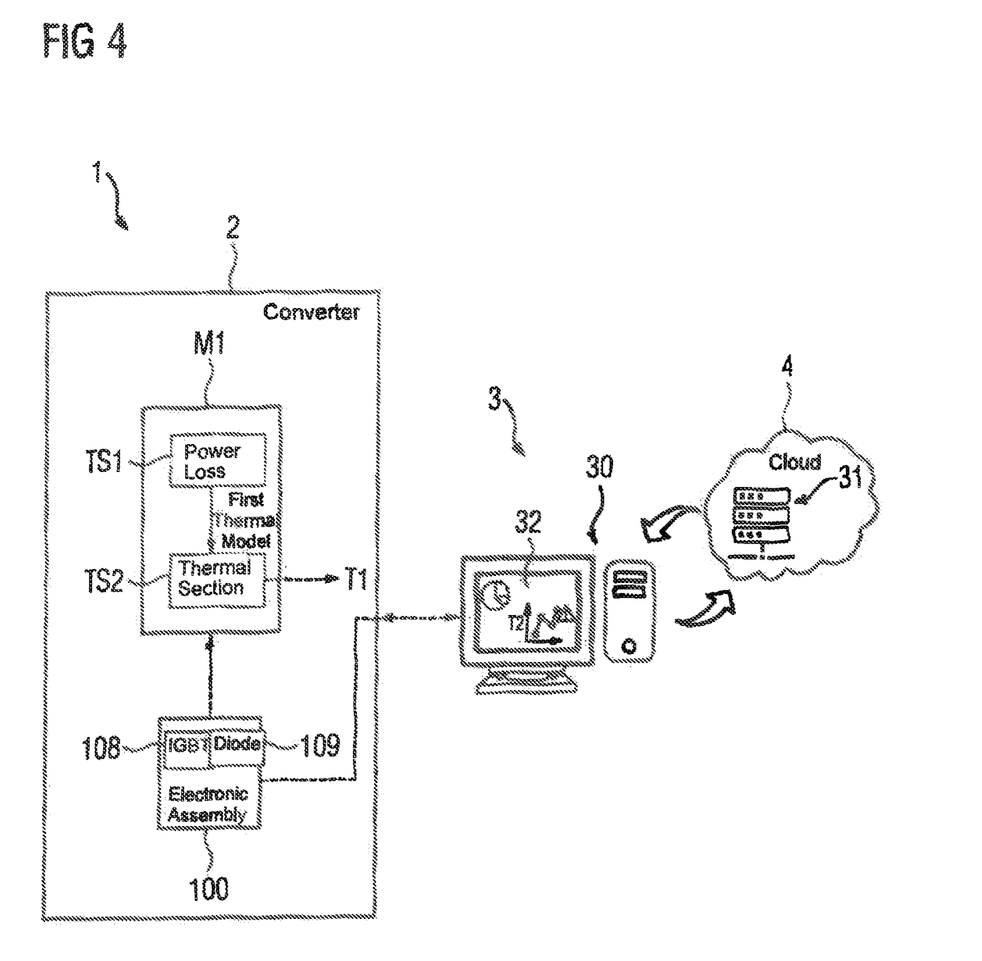
FIG. 4 shows an arrangement linked to a cloud.

By way of example, FIG. 4 shows an arrangement 1 which is linked to a cloud 4. As explained above, the first temperature T1 of the electronic components 108, 109 is calculated in the software of the converter 2 by means of the first thermal model M1, it being possible for the first thermal model M1 to comprise two substeps TS1 and TS2 as mentioned above. The superordinate control entity 3 can comprise a plurality of component parts in this case. For example, superordinate control entity 3 comprises a local (i.e. not arranged in the cloud) computing unit 30, which is configured for communication with a cloud server 31. A computer program 32 is stored in an executable manner on the computing unit 30, e.g. on a hard disk (not shown). When the computer program 32 is executed, it instructs the arrangement 1 to execute one or more of the aforementioned method steps. In this case, the computer program 32 can instruct the computing unit 30 in such a way that the computing unit 30 calculates the second thermal model M2 and if necessary in this case accesses the computing resources of the cloud server 31 in order to determine e.g. the second temperature 12 in accordance with one or more of the aforementioned options of the second thermal model M2. In particular, taking all thermal couplings into account can be intensive in computing terms, and therefore the computing resources of the cloud server 31 are very useful in this case.

Although the invention is illustrated and described in detail with reference to exemplary embodiments, it is not limited to the examples disclosed. Variations thereof may be derived by a person skilled in the art without departing from the scope of the invention as defined in the following claims. In particular, features described in connection with the method can also be used in conjunction with or as additions to the arrangement, and vice versa.

The invention claimed is:

1. An arrangement, comprising:
a supply unit of an industrial control system, said supply unit including an electronic assembly which includes an electronic component, said supply unit configured to calculate a first temperature of the electronic component using a first thermal model; and
a superordinate computing unit assigned to the supply unit and configured to calculate a second temperature of the electronic component using a second thermal model, with the supply unit providing the superordinate computing unit with relevant data for a calculation of the second thermal model,
wherein the supply unit and the superordinate computing unit interact so that at least one of the first temperature and the second temperature of the electronic component is always calculated, and the superordinate computing unit can calculate the second temperature when the supply unit is without current and not operating, and the calculated second temperature can be used as an initial value when the supply unit is restarted.

2. The arrangement of claim 1, wherein the supply unit is designed as a converter.

3. The arrangement of claim 1, wherein the superordinate computing unit is designed as a superordinate controller, an Edge device, or a cloud server.

4. The arrangement of claim 1, wherein the second thermal model is more detailed than the first thermal model.

5. The arrangement of claim 1, wherein the electronic assembly comprises a temperature sensor, said second thermal model configured to determine a temperature of the temperature sensor.

6. The arrangement of claim 5, wherein the first temperature is determined as a function of the temperature of the temperature sensor as determined by the second thermal model.

7. The arrangement of claim 1, wherein the electronic component is designed as a semiconductor component.

8. The arrangement of claim 1, wherein the electronic component is designed as an IGBT or as a diode.

9. The arrangement of claim 1, wherein the electronic component is designed as an IGBT module.

10. A method for determining a temperature of an electronic component of an electronic assembly of a supply unit of an industrial control system, said method comprising:
calculating with the supply unit a first temperature of the electronic component using a first thermal model; and
calculating with a superordinate computing unit assigned to the supply unit and cooperating with the supply unit a second temperature of the electronic component using a second thermal model based on relevant data received from the supply unit;

wherein the supply unit and the superordinate computing unit interact in such a way that at least one of the first and second temperatures of the electronic component is always calculated, so that the superordinate computing unit can calculate the second temperature when the supply unit is without current and not operating, and the calculated second temperature can be used as an initial value when the supply unit is restarted.

11. The method of claim 10, further comprising determining a wear value of the electronic component based on the second temperature.

12. The method of claim 11, further comprising adapting a maintenance plan for the supply unit based on the wear value.

13. The method of claim 10, wherein the first temperature and the second temperature are calculated simultaneously while the supply unit is operating.

14. The method of claim 10, further comprising calculating at least one of the first and second temperatures of the electronic component from a power loss or a thermal section, or a combination thereof.

15. The method of claim 10, wherein calculating the first temperature is less detailed than calculating the second temperature.

16. The method of claim 10, further comprising determining a temperature of a temperature sensor of the electronic assembly when the second thermal model is calculated.

17. The method of claim 16, wherein the first temperature is determined as a function of the temperature of the temperature sensor as determined by the second thermal model.

18. The method of claim 10, wherein the superordinate computing unit assumes responsibility for the calculation of the second temperature while the supply unit is without current and not operating.

19. A non-transitory computer readable medium, stored therein a computer program, said computer program comprising instructions which, when the computer program is loaded into an arrangement comprising a supply unit of an industrial control system, said supply unit including an electronic assembly which includes an electronic component, and a superordinate computing unit assigned to the supply unit, and executed by the arrangement, cause the arrangement to perform the method of claim 10.

20. The non-transitory computer readable medium of claim 19, wherein a data carrier signal is transferred when the computer program as set forth in claim 19 is performed by the arrangement.

21. The non-transitory computer readable medium of claim 19, wherein the computer program is a cloud app.

* * * * *